US012597972B2

(12) United States Patent
Raghavan et al.

(10) Patent No.: US 12,597,972 B2
(45) Date of Patent: Apr. 7, 2026

(54) TECHNIQUES FOR GENERATING AN AVERAGE EFFECTIVE ISOTROPIC RADIATED POWER (EIRP) MASK TO SUPPORT INTERFERENCE MITIGATION

(71) Applicant: QUALCOMM Incorporated, San Diego, CA (US)

(72) Inventors: Vasanthan Raghavan, West Windsor Township, NJ (US); Mustafa Emara, Munich (DE); Michael Alexander Ruder, Pommelsbrunn (DE); Marco Papaleo, Bologna (IT)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/478,802

(22) Filed: Sep. 29, 2023

(65) Prior Publication Data

US 2024/0396602 A1     Nov. 28, 2024

Related U.S. Application Data

(60) Provisional application No. 63/504,071, filed on May 24, 2023.

(51) Int. Cl.
*H04B 7/06* (2006.01)

(52) U.S. Cl.
CPC ......... *H04B 7/0617* (2013.01); *H04B 7/0626* (2013.01)

(58) Field of Classification Search
CPC ... H04B 7/0695; H04B 7/0617; H04B 7/0626
See application file for complete search history.

(56) References Cited

U.S. PATENT DOCUMENTS 11,863,276 B2 *  1/2024  Hirzallah ............. H04B 7/0695
12,143,196 B2 *  11/2024  Pezeshki ............... H04B 7/088
(Continued)

FOREIGN PATENT DOCUMENTS

WO     WO-2021230777 A1     11/2021

OTHER PUBLICATIONS

International Search Report and Written Opinion—PCT/US2024/024665—ISA/EPO—Aug. 30, 2024.

*Primary Examiner* — Abdullahi E Salad
(74) *Attorney, Agent, or Firm* — Holland & Hart LLP

(57) ABSTRACT

Methods, systems, and devices for wireless communications are described. Generally, the techniques described herein may support generating an average effective isotropic radiated power (EIRP) mask in accordance with a set of weighted values to support interference management. For example, a wireless device may obtain one or more information bits for transmission by the wireless device via a transmit beam of multiple transmit beams of the wireless device and may generate, based on one or more directional parameters associated with a beamforming direction of the transmit beam, a set of weighted values for an average EIRP mask for the transmission of the one or more information bits. Additionally, the wireless device may transmit, via the transmit beam in the beamforming direction based on the one or more directional parameters and the set of weighted values, a signal comprising the one or more information bits to meet the average EIRP mask.

30 Claims, 9 Drawing Sheets

(56) References Cited

U.S. PATENT DOCUMENTS

| 2007/0046539 | A1 * | 3/2007 | Mani .................... H04B 7/0695 |
| | | | 342/383 |
| 2020/0021349 | A1 | 1/2020 | Chapman et al. |
| 2020/0077411 | A1 * | 3/2020 | Raghavan ............ H04B 7/0617 |
| 2020/0322812 | A1 * | 10/2020 | Shi ........................ H04W 16/28 |
| 2022/0140885 | A1 | 5/2022 | Vieira et al. |
| 2022/0141681 | A1 * | 5/2022 | Flesch .................. H04B 17/382 |
| | | | 370/252 |
| 2023/0261706 | A1 * | 8/2023 | Raghavan ............ H04B 7/0469 |
| | | | 455/501 |
| 2023/0344533 | A1 * | 10/2023 | Wang ................... H04B 17/102 |
| 2024/0007180 | A1 * | 1/2024 | Raghavan ........... H04W 52/367 |

* cited by examiner

205

215

115-a 105-a

Signaling
210

Transmit
Beam
220

Elevation Angle 225

Azimuth Angle 230

200

410                    420                    415

405

400

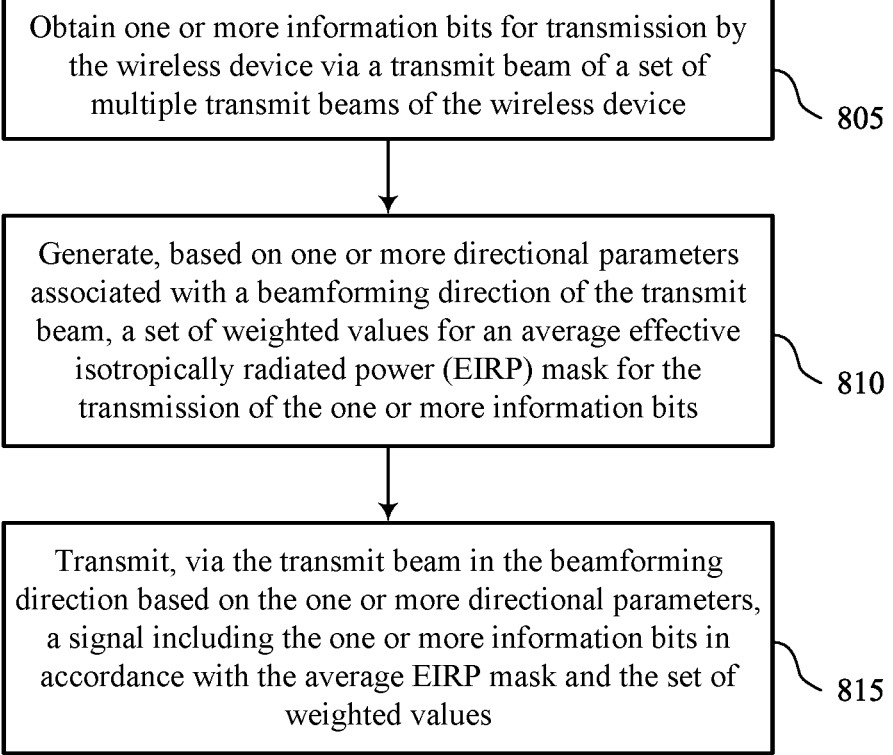

Obtain one or more information bits for transmission by the wireless device via a transmit beam of a set of multiple transmit beams of the wireless device

805

Generate, based on one or more directional parameters associated with a beamforming direction of the transmit beam, a set of weighted values for an average effective isotropically radiated power (EIRP) mask for the transmission of the one or more information bits

810

Transmit, via the transmit beam in the beamforming direction based on the one or more directional parameters, a signal including the one or more information bits in accordance with the average EIRP mask and the set of weighted values

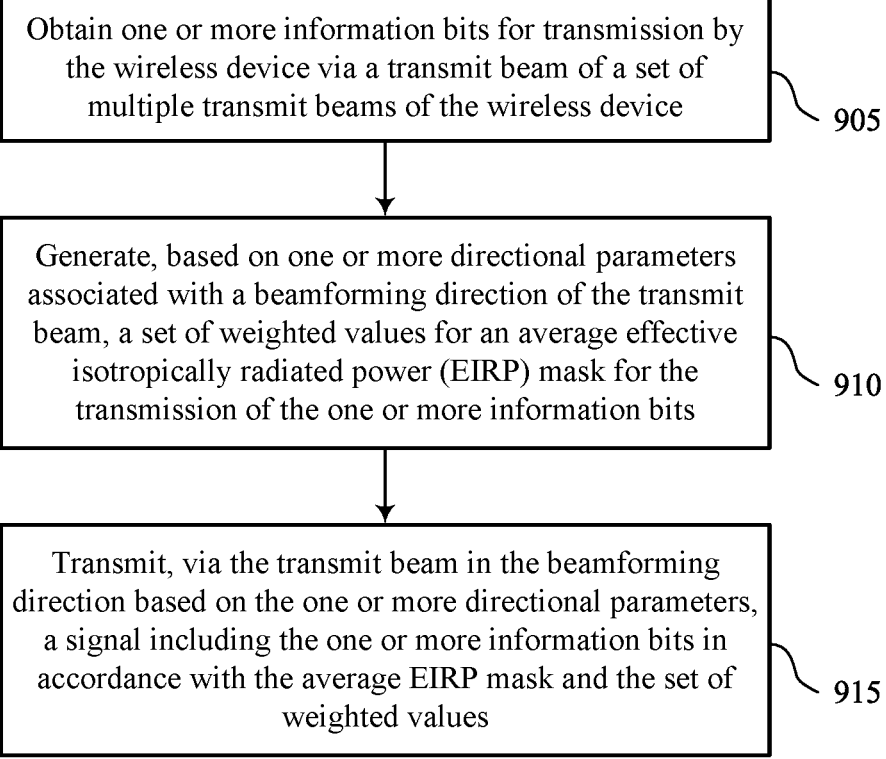

Obtain one or more information bits for transmission by the wireless device via a transmit beam of a set of multiple transmit beams of the wireless device ⎯⎯ 905

Generate, based on one or more directional parameters associated with a beamforming direction of the transmit beam, a set of weighted values for an average effective isotropically radiated power (EIRP) mask for the transmission of the one or more information bits ⎯⎯ 910

Transmit, via the transmit beam in the beamforming direction based on the one or more directional parameters, a signal including the one or more information bits in accordance with the average EIRP mask and the set of weighted values ⎯⎯ 915

TECHNIQUES FOR GENERATING AN AVERAGE EFFECTIVE ISOTROPIC RADIATED POWER (EIRP) MASK TO SUPPORT INTERFERENCE MITIGATION

CROSS REFERENCE

The present application for patent claims the benefit of U.S. Provisional Patent Application No. 63/504,071 by RAGHAVAN et al., entitled "TECHNIQUES FOR GENERATING AN AVERAGE EFFECTIVE ISOTROPIC RADIATED POWER (EIRP) MASK TO SUPPORT INTERFERENCE MITIGATION," filed May 24, 2023, assigned to the assignee hereof, and expressly incorporated by reference herein.

FIELD OF TECHNOLOGY

The following relates to wireless communications, including techniques for generating and meeting an average effective isotropic radiated power (EIRP) mask to support interference mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for generating and meeting an average effective isotropic radiated power (EIRP) mask to enable interference mitigation. Generally, the techniques described herein enable a wireless device to generate a set of weighted values for generation of a power mask (e.g., an average EIRP mask) for transmission of one or more information bits via a set of transmit beams, each of them steered in a given beamforming direction. For example, a wireless device may obtain one or more information bits for transmission and generate, based on one or more directional parameters associated with a beamforming direction of the transmit beam (e.g., an azimuth angle, an elevation angle, or both), a set of weighted values for an average EIRP mask for the transmission of the one or more information bits via a transmit beam. That is, the wireless device may generate (e.g., calculate) the average EIRP mask based on averaging a transmitted power over a range of values of the one or more directional parameters using the set of weighted values. As such, the wireless device may transmit, via the transmit beam in the beamforming direction, a signal comprising the one or more information bits to meet the average EIRP mask.

A method for wireless communications at a wireless device is described. The method may include obtaining one or more information bits for transmission by the wireless device via a transmit beam of a set of multiple transmit beams of the wireless device, generating, based on one or more directional parameters associated with a beamforming direction of the transmit beam, a set of weighted values for the transmission of the one or more information bits to satisfy an average EIRP mask, and transmitting, via the transmit beam in the beamforming direction based on the one or more directional parameters and the set of weighted values, a beamformed signal including the one or more information bits to meet the average EIRP mask.

An apparatus for wireless communications at a wireless device is described. The apparatus may include at least one processor, at least one memory coupled with the at least one processor, and instructions stored in the at least one memory. The instructions may be executable by the at least one processor to cause the apparatus to obtain one or more information bits for transmission by the wireless device via a transmit beam of a set of multiple transmit beams of the wireless device, generate, based on one or more directional parameters associated with a beamforming direction of the transmit beam, a set of weighted values for the transmission of the one or more information bits to satisfy an average EIRP mask, and transmit, via the transmit beam in the beamforming direction based on the one or more directional parameters and the set of weighted values, a beamformed signal including the one or more information bits to meet the average EIRP mask.

Another apparatus for wireless communications at a wireless device is described. The apparatus may include means for obtaining one or more information bits for transmission by the wireless device via a transmit beam of a set of multiple transmit beams of the wireless device, means for generating, based on one or more directional parameters associated with a beamforming direction of the transmit beam, a set of weighted values for the transmission of the one or more information bits to satisfy an average EIRP mask, and means for transmitting, via the transmit beam in the beamforming direction based on the one or more directional parameters and the set of weighted values, a beamformed signal including the one or more information bits to meet the average EIRP mask.

A non-transitory computer-readable medium storing code for wireless communications at a wireless device is described. The code may include instructions executable by a processor to obtain one or more information bits for transmission by the wireless device via a transmit beam of a set of multiple transmit beams of the wireless device, generate, based on one or more directional parameters associated with a beamforming direction of the transmit beam, a set of weighted values for the transmission of the one or more information bits to satisfy an average EIRP mask, and transmit, via the transmit beam in the beamforming direction based on the one or more directional parameters and the set of weighted values, a beamformed signal including the one or more information bits to meet the average EIRP mask.

In some examples of the method, apparatuses, and non-transitory computer-readable medium described herein, meeting the average EIRP mask may include operations, features, means, or instructions for transmitting, based on the set of weighted values, one or more additional signals over a range of azimuth angles, a range of elevation angles or both and averaging a set of EIRP values associated with each azimuth angle of the range of azimuth angles, each elevation angle of the range of elevation angles, or both, over a time duration, where meeting the average EIRP mask may be based on the averaged set of EIRP values being less than the average EIRP mask.

In some examples of the method, apparatuses, and non-transitory computer-readable medium described herein, the time duration over which the set of EIRP values may be averaged may be based on a configuration of the wireless device or based on a regulatory requirement.

In some examples of the method, apparatuses, and non-transitory computer-readable medium described herein, generating the set of weighted values may include operations, features, means, or instructions for generating a first weighted value of the set of weighted values based on a ratio of an elemental gain associated with an antenna at a first azimuth angle from a range of azimuth angles to a maximum elemental gain associated with the antenna over the range of azimuth angles.

In some examples of the method, apparatuses, and non-transitory computer-readable medium described herein, the ratio may be averaged over a time duration and the time duration may be based on a configuration of the wireless device.

In some examples of the method, apparatuses, and non-transitory computer-readable medium described herein, generating the set of weighted values may include operations, features, means, or instructions for generating a first weighted value of the set of weighted values based on a ratio of a RSRP associated with steering the transmit beam towards a first elevation angle from a range of elevation angles to a maximum RSRP associated with steering the transmit beam over the range of elevation angles.

In some examples of the method, apparatuses, and non-transitory computer-readable medium described herein, the ratio may be averaged over a time duration and the time duration may be based on a configuration of the wireless device.

In some examples of the method, apparatuses, and non-transitory computer-readable medium described herein, generating the set of weighted values may include operations, features, means, or instructions for generating a first weighted value of the set of weighted values associated with a first azimuth angle and a first elevation angle and generating a second weighted value of the set of weighted values associated with a second azimuth angle and a second elevation angle based on a first difference between the first azimuth angle and the second azimuth angle, between the first elevation angle and the second elevation angle, or both, where a second difference between the first weighted value and the second weighted value may be based on the first difference.

In some examples of the method, apparatuses, and non-transitory computer-readable medium described herein, the second difference may be averaged over a time duration and the time duration may be based on a configuration of the wireless device.

Some examples of the method, apparatuses, and non-transitory computer-readable medium described herein may further include operations, features, means, or instructions for generating the average EIRP mask based on averaging a transmitted power over a range of values of the one or more directional parameters using the set of weighted values, where the range of values may be based on a frequency associated with transmission of the signal.

In some examples of the method, apparatuses, and non-transitory computer-readable medium described herein, the range of values of the one or more directional parameters includes a range of azimuth angles, a range of elevation angles, or both.

In some examples of the method, apparatuses, and non-transitory computer-readable medium described herein, the range of values of the one or more directional parameters may be a fixed range independent of the beamforming direction of the transmit beam.

In some examples of the method, apparatuses, and non-transitory computer-readable medium described herein, the range of values of the one or more directional parameters may be based on the beamforming direction of the transmit beam.

In some examples of the method, apparatuses, and non-transitory computer-readable medium described herein, generating the set of weighted values may include operations, features, means, or instructions for generating a first weighted value of the set of weighted values based on a ratio of a RSRP associated with steering the set of multiple transmit beams generated with an antenna array towards a first elevation angle from a range of elevation angles to a maximum RSRP associated with steering the set of multiple transmit beams over the range of elevation angles.

In some examples of the method, apparatuses, and non-transitory computer-readable medium described herein, the ratio may be averaged over a time duration and the time duration may be based on a configuration of the wireless device.

Some examples of the method, apparatuses, and non-transitory computer-readable medium described herein may further include operations, features, means, or instructions for transmitting an indication of a capability of the wireless device to generate the set of weighted values for the average EIRP mask based on the one or more directional parameters associated with the beamforming direction of the transmit beam.

Some examples of the method, apparatuses, and non-transitory computer-readable medium described herein may further include operations, features, means, or instructions for receiving an indication of a time duration associated with generating the set of weighted values for the average EIRP mask and initiating a timer associated with the time duration based on receiving the indication, where the one or more information bits may be transmitted prior to expiration of the timer.

In some examples of the method, apparatuses, and non-transitory computer-readable medium described herein, the average EIRP mask may be associated with a set of multiple frequency ranges, a set of multiple frequencies within a frequency range, or both.

In some examples of the method, apparatuses, and non-transitory computer-readable medium described herein, the one or more directional parameters includes an azimuth angle, an elevation angle, or both.

5

Figure 2:
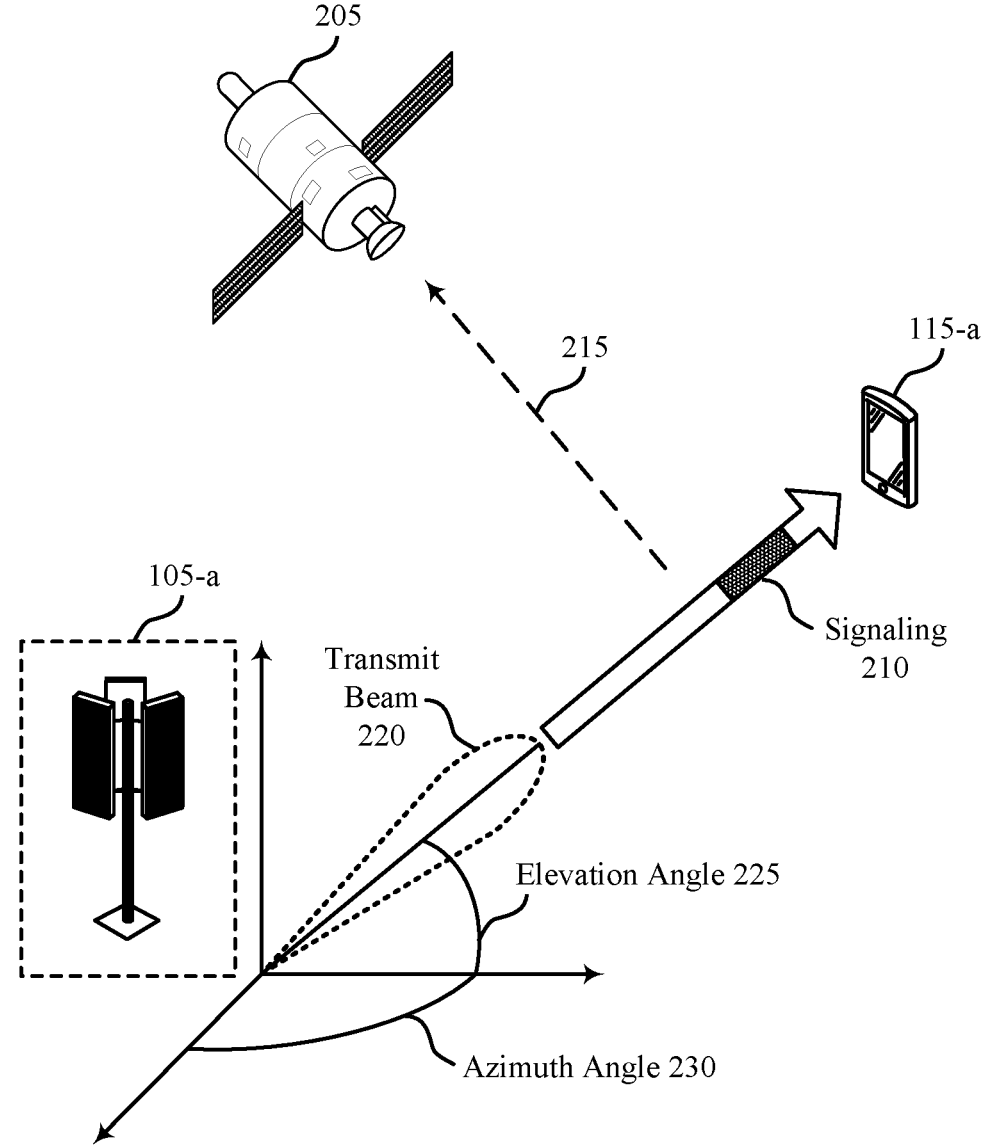

FIG. 2 shows an example of a wireless communications system that supports techniques for generating and meeting an EIRP mask to enable interference mitigation in accordance with one or more aspects of the present disclosure.

Figure 3:
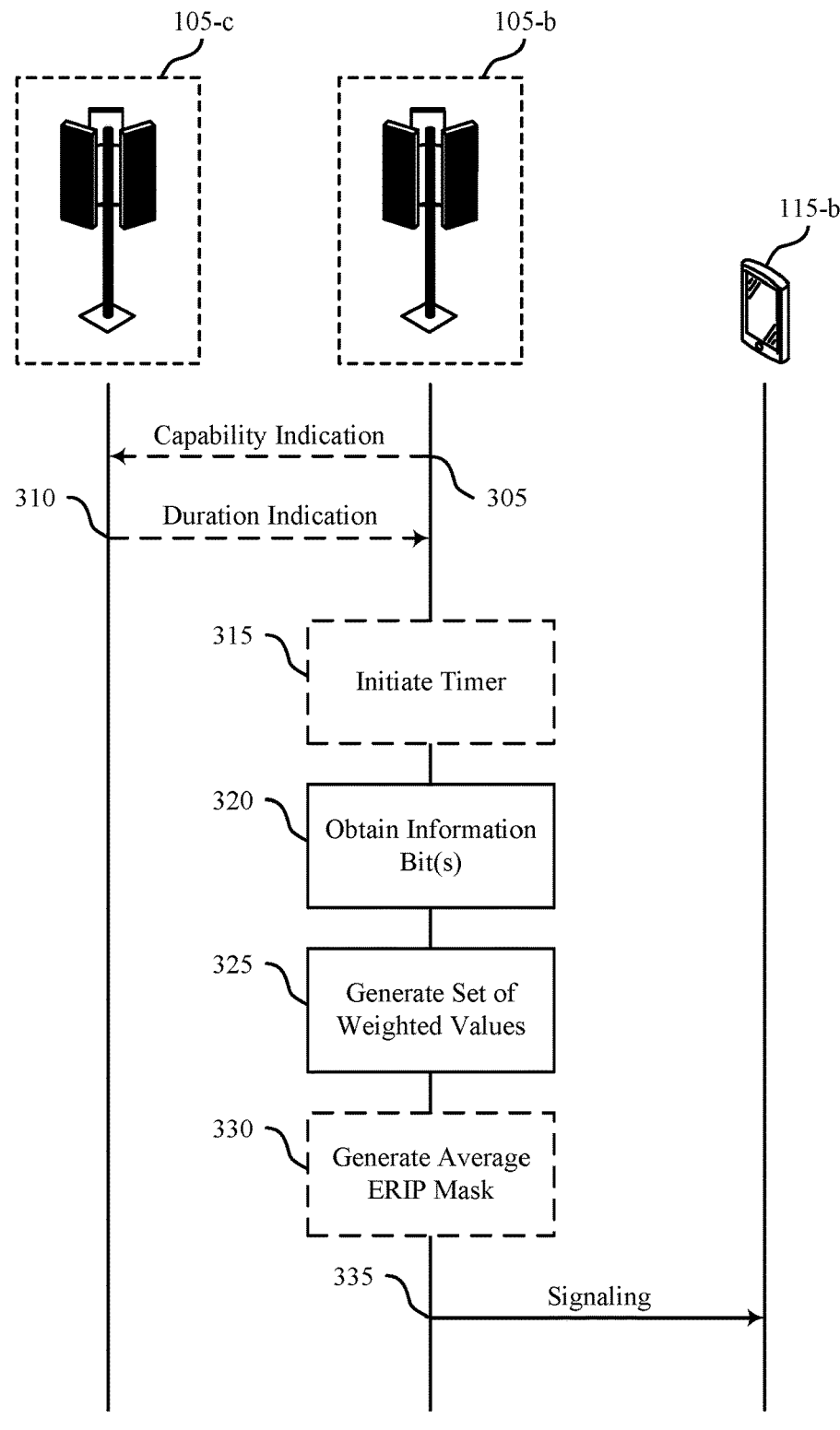

FIG. 3 shows an example of a process flow that supports techniques for generating and meeting an EIRP mask to enable interference mitigation in accordance with one or more aspects of the present disclosure.

Figure 4:
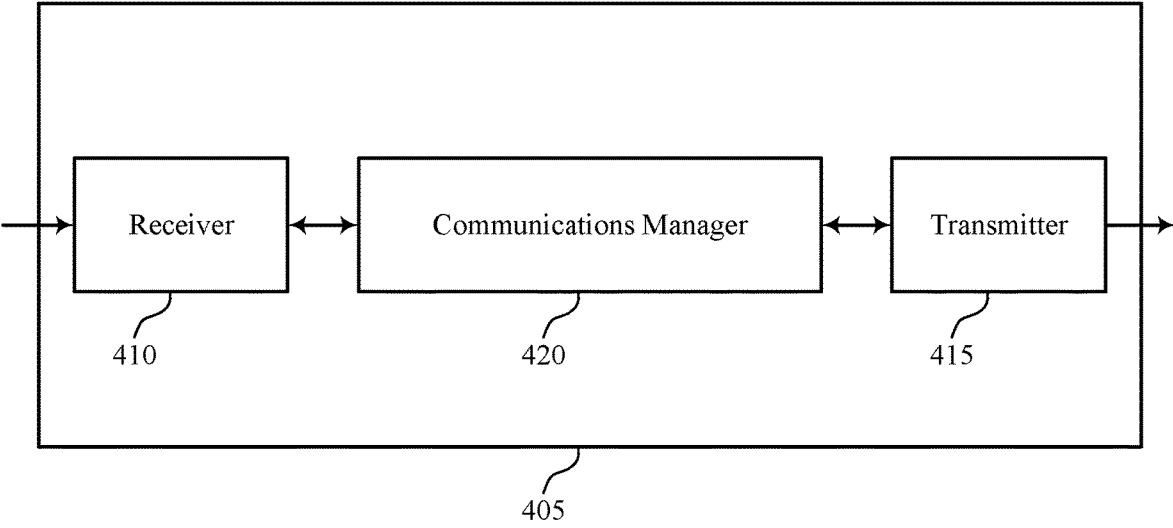
Figure 5:
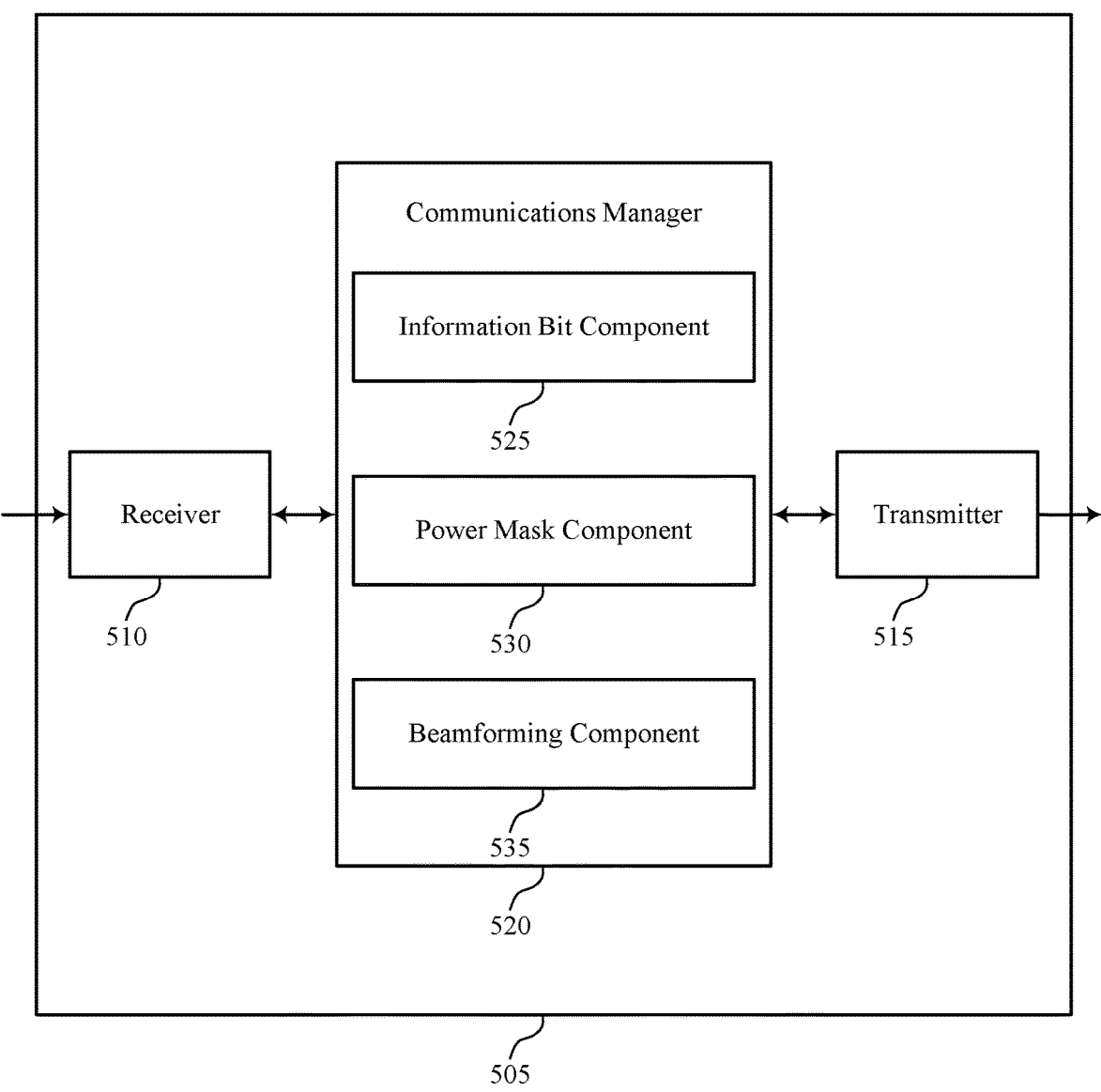

FIGS. 4 and 5 show block diagrams of devices that support techniques for generating and meeting an EIRP mask to enable interference mitigation in accordance with one or more aspects of the present disclosure.

Figure 6:
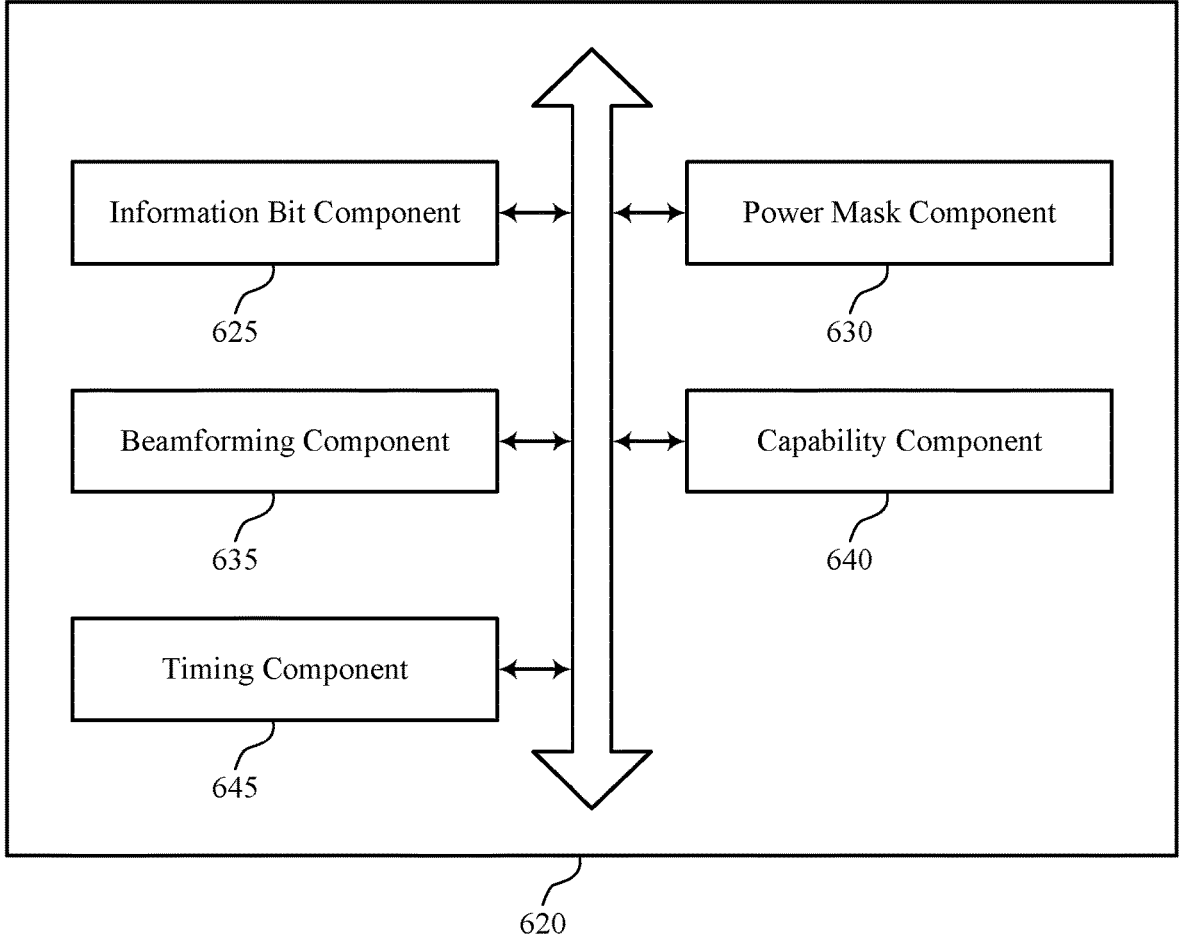

FIG. 6 shows a block diagram of a communications manager that supports techniques for generating and meeting an EIRP mask to enable interference mitigation in accordance with one or more aspects of the present disclosure.

Figure 7:
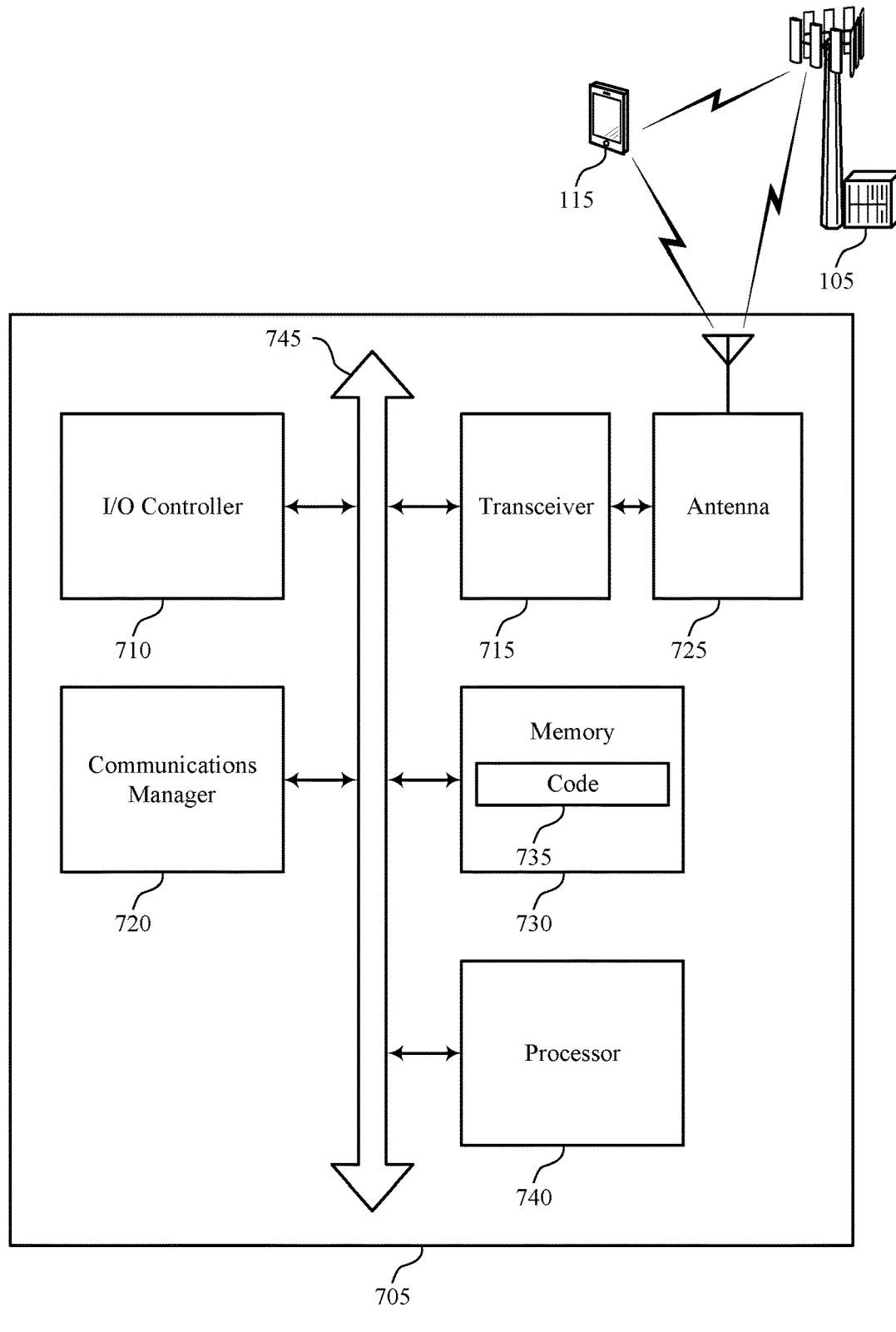

FIG. 7 shows a diagram of a system including a device that supports techniques for generating and meeting an EIRP mask to enable interference mitigation in accordance with one or more aspects of the present disclosure.

FIGS. 8 and 9 show flowcharts illustrating methods that support techniques for generating and meeting an EIRP mask to enable interference mitigation in accordance with one or more aspects of the present disclosure.

DETAILED DESCRIPTION

Some wireless communications systems may support multiple wireless devices capable of communicating in a same frequency range. For example, multiple terrestrial devices (e.g., user equipments (UEs), network entities, etc.) associated with a terrestrial network (TN) and multiple non-terrestrial devices (e.g., airplane radio altimeters, satellites, etc.) associated with a non-terrestrial network (NTN) may share a same frequency range, such that communications transmitted by the terrestrial wireless devices may interfere with communications transmitted by the non-terrestrial wireless devices (e.g., and vice-versa). Communications between terrestrial wireless devices and non-terrestrial wireless devices may be referred to as air-to-ground (ATG) communications. In some examples, the communications transmitted by the non-terrestrial wireless devices may be of high priority, such that failed communications (e.g., due to interference) may result in safety concerns (e.g., a breach in safety regulations) or catastrophic events. As such, the terrestrial wireless devices may apply a power mask, such as an effective isotropic radiated power (EIRP) mask, to transmissions by the terrestrial wireless devices to reduce emissions by the terrestrial devices, which may reduce the interference experienced by the non-terrestrial wireless devices caused by transmissions from the terrestrial devices. In some examples, the EIRP mask may be a maximum EIRP mask, or a maximum allowed EIRP at a certain elevation angle. However, the terrestrial wireless devices may be unable to achieve the maximum EIRP mask (e.g., stay below the maximum allowed EIRP) while maintaining communication performance. In some other examples, the EIRP mask may be an average EIRP mask, or an average of the EIRP for a certain elevation angle over a range of azimuth angles. However, the range of azimuth angles may include azimuth angles that are beyond a sectoral coverage area of the terrestrial wireless devices and associated with lower EIRP values, which may impact the average EIRP mask and increase the likelihood of the non-terrestrial devices experiencing interference.

Accordingly, techniques described herein may support generation and meeting of an average EIRP mask using a set of weighted values. That is, a terrestrial wireless device may generate a set of weighted values associated with an average EIRP mask based on one or more directional parameters (e.g., azimuth, elevation) associated with a beamforming direction of a transmit beam to be used by the terrestrial wireless device to transmit signaling. In some examples, the one or more directional parameters may include an azimuth angle, such that each weighted parameter of the set of weighted parameters may be based on a ratio of an elemental gain associated with an antenna at a first azimuth angle from a range of azimuth angles to a maximum elemental gain associated with the antenna over the range of azimuth angles. In some other examples, the one or more directional parameters may include an elevation angle, such that each weighted parameter of the set of weighted parameters may be based on a ratio of a reference signal received power (RSRP) or signal strength associated with steering the transmit beam towards a first elevation angle from a range of elevation angles to a maximum RSRP or signal strength associated with steering the transmit beam over the range of elevation angles. In some other examples, the one or more directional parameters may include the azimuth angle and the elevation angle, such that each weighted parameter of the set of weighted parameters may be based on a ratio of an RSRP associated with steering the plurality of transmit beams generated with an antenna array towards a first elevation angle from a range of elevation angles to a maximum RSRP associated with steering the multiple transmit beams over the range of elevation angles.

As such, the terrestrial wireless device may generate the average EIRP mask based on averaging a transmitted power over a range of values of the one or more directional parameters using the set of weighted values. In such cases, the range of values may be based on a frequency associated with transmission of the signaling. Additionally, or alternatively, the average EIRP mask may be associated with multiple frequency ranges, multiple frequencies within a frequency range, or both. Transmitting signaling in accordance with the average EIRP mask based on the set of weighted values may mitigate or reduce interference experienced by non-terrestrial wireless devices while maintaining communication performance for terrestrial devices.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for generating an average EIRP mask to support interference mitigation.

Figure 1:
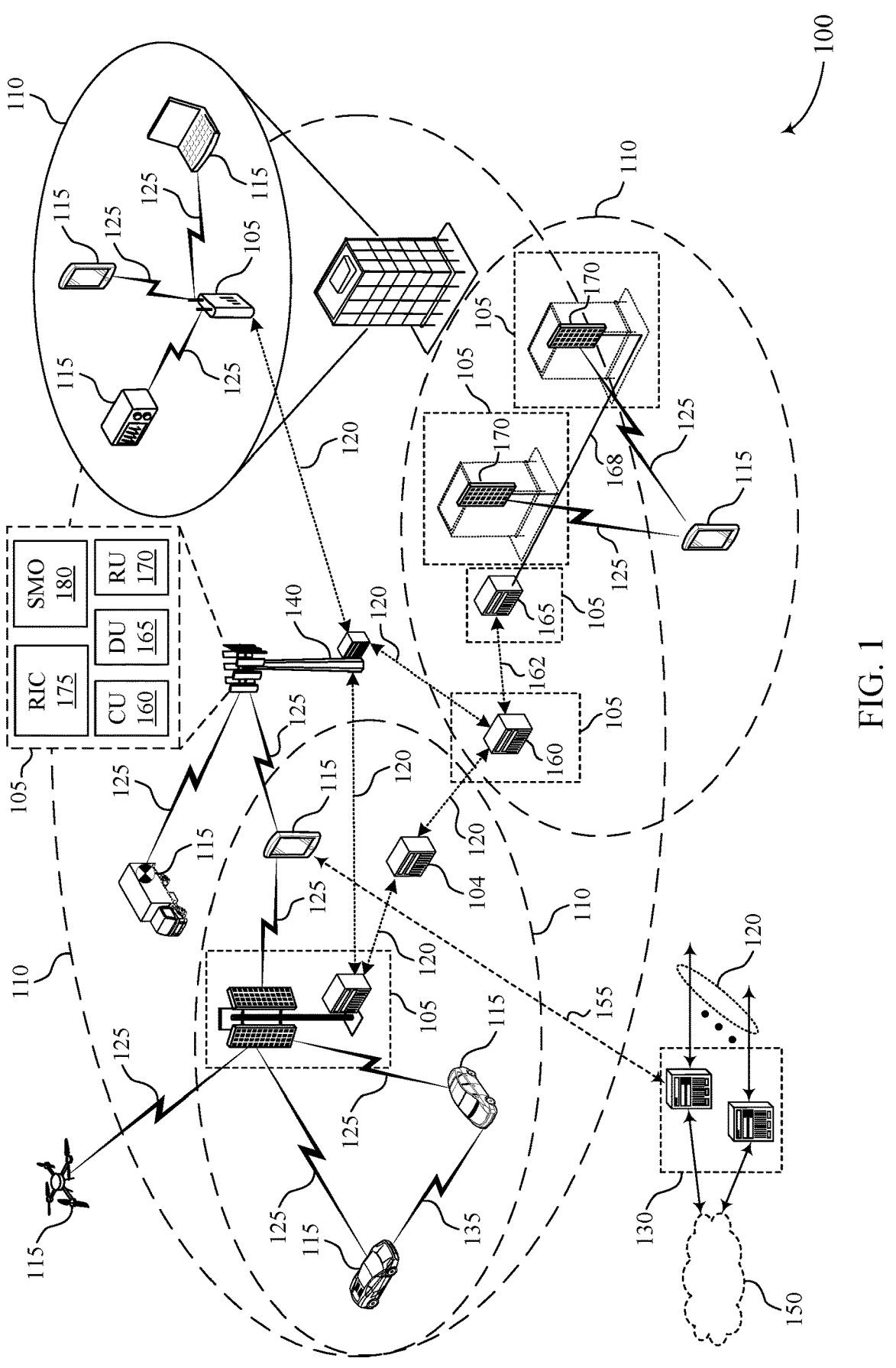
FIG. 1 shows an example of a wireless communications system that supports techniques for generating and meeting an average effective isotropic radiated power (EIRP) mask to enable interference mitigation in accordance with one or more aspects of the present disclosure.

FIG. 1 shows an example of a wireless communications system 100 that supports techniques for generating an EIRP mask to enable interference mitigation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (cNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for generating an EIRP mask to support interference mitigation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support generation of an average EIRP mask using a set of weighted values. That is, a wireless device, such as a network entity 105 or UE 115, may generate a set of weighted values associated with an average EIRP mask based on one or more directional parameters associated with a beamforming direction of a transmit beam from multiple transmit beams to be used to transmit signaling. In some examples, the one or more directional parameters may include an azimuth angle, such that each weighted parameter of the set of weighted parameters may be based on a ratio of an elemental gain associated with an antenna at a first azimuth angle from a range of azimuth angles to a maximum elemental gain associated with the antenna over the range of azimuth angles. In some other examples, the one or more directional parameters may include an elevation angle, such that each weighted parameter of the set of weighted parameters may be based on a ratio of a RSRP associated with steering the transmit beam towards a first elevation angle from a range of elevation angles to a maximum RSRP associated with steering the transmit beam over the range of elevation angles. In some other examples, the one or more directional parameters may include the azimuth angle and the elevation angle, such that each weighted parameter of the set of weighted parameters may be based on a ratio of an RSRP associated with steering the plurality of transmit beams generated with an antenna array towards a first elevation angle from a range of elevation angles to a maximum RSRP associated with steering the multiple transmit beams over the range of elevation angles.

As such, the network entity 105 or UE 115 may generate the average EIRP mask based on averaging a transmitted power over a range of values of the one or more directional parameters using the set of weighted values. In such cases, the range of values may be based on a frequency associated with transmission of the signaling. Additionally, or alternatively, the average EIRP mask may be associated with multiple frequency ranges, multiple frequencies within a frequency range, or both. Transmitting signaling in accordance with the average EIRP mask based on the set of weighted values may mitigate interference with communications by non-terrestrial wireless devices while maintaining communication performance.

FIG. 2 shows an example of a wireless communications system 200 that supports techniques for generating and meeting an EIRP mask to enable interference mitigation in accordance with one or more aspects of the present disclosure. In some cases, the wireless communications system 200 may implement or be implemented by aspects of the wireless communications system 100. For example, the wireless communications system 200 may include one or more UEs 115 (e.g., a UE 115-*a*) and one or more network entities 105 (e.g., a network entity 105-*a*), which may be examples of the corresponding devices as described herein.

Some wireless communications systems, such as the wireless communications system 200, may support multiple wireless devices capable of communicating in a same frequency range. That is, multiple terrestrial devices (e.g., the UE 115-*a*, the network entity 105-*a*) associated with a TN and multiple non-terrestrial devices (e.g., a satellite 205, an airplane radio altimeter, etc. at altitude ranges of 3-10 kilometers) associated with an NTN (e.g., ATG networks) may share a same frequency band, such that communications transmitted by the terrestrial wireless devices may interfere with communications transmitted by the non-terrestrial wireless devices (e.g., and visa-versa). For example, an airplane radio altimeter (RA) may operate in a first frequency range (e.g., 4.2-4.4 GHZ) and a terrestrial wireless device (e.g., cellular services), such as the network entity 105-*a*, may operate in a second frequency range (e.g., 3.98 GHz in some geographies, such as the United States), where the first frequency range and the second frequency range are from a same frequency band (e.g., C-band). In such cases, signaling 210 transmitted by the network entity 105-*a* may cause interference 215 (e.g., through leaked radiation) with communications transmitted or received by the airplane RA. In such cases, the communications transmitted or received by the airplane RA may be of high priority, such that such that failed communications due to the interference may result in safety concerns or poor performance of the airplane RAs.

In another example, the network entity 105-*a* may share (e.g., coexist within) a same frequency band (e.g., FR3 or frequencies between 7.125 and 24.25 GHZ) with the satellite 205 (e.g., satellite service), such that signaling 210 transmitted by the network entity 105-*a* may cause interference 215 (e.g., may interfere) with communications transmitted or received by the satellite 205. In another example, the network entity 105-*a*, the UE 115-*a*, or another wireless device (e.g., infrastructure nodes such as repeaters, relays, intelligent reflecting surface (IRS) nodes, IAB nodes) may transmit signaling 210 using large antenna arrays (e.g., greater than or equal to 64 antenna elements) in a same frequency band (e.g., mmW, FR4, FR5, etc.) as non-terrestrial wireless devices, such as the satellite 205, such that the signaling 210 transmitted by the network entity 105-*a*, the UE 115-*a*, or the other wireless device may cause interference 215 with communications transmitted or received by the satellite 205 (e.g., existing services/operations).

As such, the network entity 105 may apply an EIRP mask to transmission of the signaling 210 to reduce emissions by the network entity 105-*a*, thus reducing the interference 215 experienced by the satellite 205 (e.g., non-terrestrial wireless device). An EIRP mask may be an allowed maximum set of EIRP values, as a function of elevation angles 225, from the network entity 105-*a* (e.g., an aggressor node). In other words, the network entity 105-*a* may transmit the signaling 210 via a transmit beam 220 according to a set of EIRP values which satisfy the EIRP mask. In such cases, the EIRP mask may be a maximum EIRP mask or an average EIRP mask. The maximum EIRP value may be a maximum allowed EIRP at a given elevation angle 225. The maximum EIRP mask may be higher than the average EIRP mask (e.g., may be more stringent) and, thus, may be preferred by the satellite 205 (e.g., the non-terrestrial wireless devices). However, in such cases, the network entity 105-*a* may be unable to achieve the maximum EIRP mask (e.g., stay below the maximum allowed EIRP) while maintaining good communication performance.

The average EIRP mask may be an average of the EIRP for the given elevation angle 225 over a given beam space, or a given range of azimuth angles 230. The average EIRP mask may be lower than the maximum EIRP mask (e.g., may be more relaxed as the averaging allows a relaxed performance) and, thus, may be preferred by the network entity 105-*a* (e.g., the infrastructure vendors). That is, the beam space, or range of azimuth angles 230, used to average the EIRP for the given elevation angle 225 may be −180 degrees to 180 degrees. However, the network entity 105-*a* may provide sectoral performance. For example, the network entity 105-*a* may provide poor coverage beyond a ±60 degree or ±45 degree azimuth region around the boresight direction. As such, averaging the EIRP may not only include the ±60 degree or ±45 degree azimuth region, but also include back or side lobes which may be associated with lower EIRP values than EIRP values associated with azimuth angles 230 within the ±60 degree or ±45 degree azimuth region. Thus, averaging the EIRP over the entire beam space (e.g., of −180 degrees to 180 degrees) may lead to a reduced value of the average EIRP mask, as compared to averaging the EIRP over the ±60 degree or ±45 degree azimuth region (e.g., sectoral coverage region). In such cases, the network entity 105-*a* may exceed an EIRP (e.g., EIRP limit) associated with non-interference in the ±60 degree or ±45 degree azimuth (e.g., in-coverage region), but still meet the average EIRP mask. As such, the signaling 210 transmitted by the network entity 105-*a* may cause interference 215 with communications transmitted or received by the satellite 205.

Accordingly, techniques described herein may support generating an average weighted EIRP mask, which may be referred to as an average EIRP, based on a set of weighted values, or weights, to support interference reduction or mitigation. For example, the average EIRP (e.g., mean EIRP), $\bar{P}$, at a given elevation angle 225, $\theta_0$, may be generated (e.g., calculated, measured) by measuring values of EIRP. P. (e.g., in milliwatts/Megahertz) towards the elevation angle 225 (e.g., vertical angle) and at a quantity, N, of azimuth angles 230 (e.g., horizontal angles), $\varphi_n$, uniformly spaced within a range of azimuth angles 230 (e.g., −180 to 180 degrees) and a quantity, K, of beamforming directions, and averaging the measured EIRP values based on a set of weights, $w_{n,k}$, where each weight of the set of weights is associated with an azimuth angle, an elevation angle, or both. In other words, the network entity 105-*a* may perform a weighted average of the measured EIRP values according to the following Equation 1:

$$\bar{P}(\theta_0) = \frac{1}{KN} \sum_{k=1}^{K} \sum_{n=1}^{N} w_{n,k} P(\theta_0, \varphi_n, \theta_{TL,k}, \varphi_{SC,k}) \tag{1}$$

where $\theta_{TL,k}$ may represent an electrical vertical (e.g., beamforming) down-tilt angle and $\varphi_{SC,k}$ may represent an electrical horizontal (e.g., beamforming) scan angle. In such cases, a configuration of the network entity 105-*a* may define (e.g., specify) the quantity, N, of azimuth angles 230 at which EIRP may be measured and averaged, as well as values of the given elevation angle 225, $\theta_0$, for which the average EIRP may be calculated. In such cases, N may be defined such that a threshold level of accuracy (e.g., sufficiently accurate) is achieved via averaging while failing to exceed a threshold quantity of measurements (e.g., prohibitive number of measurements). Additionally, a set of values of the given elevation angle 225, $\theta_0$, may be defined such that compliance with limits defined in a technical specification may be achieved. In some examples, the configuration of the network entity 105-*a* may define one or more operational parameters associated with the network entity 105-*a* (e.g., beamforming directions) during a duration in which the EIRP may be measured at the quantity, N, of azimuth angles 230 (e.g., during the test procedure) to support reliable measurements.

In some examples, the weight, $w_{n,k}$, for each azimuth angle 230, n, and each elevation angle 225, k, may be 1 (e.g., $w_{n,k}=1$). That is, an average EIRP with equal weighting may imply that all directions around the network entity 105-*a* are equally likely to be used by the network entity 105-*a* (e.g., are made the same). However, such an implication may not be reflective of operations of the network entity 105-*a* (e.g., from a practical deployment perspective). That is, elemental gain of antenna elements of the network entity 105-*a* may decrease as the network entity 105-*a* scans beyond a boresight direction. For example, elemental gain may be calculated/approximated according to the following Equation 2:

$$\text{gain}(f, \theta) = A(f) \times \cos(\theta)^{1.5} \tag{2}$$

where f may represent a frequency and $\theta$ may represent an elevation angle 225. In some examples (e.g., depending on a substrate used in an antenna design of the antenna elements), $\cos(\theta)^n$ for different values of n may be considered in the above formula. As such, emissions resulting in interference 215 beyond the boresight direction may be reduced (e.g., attenuated) based on an elemental gain drop experienced beyond the boresight direction. Thus, the weight, $w_{n,k}$, for each azimuth angle 230, n, and each elevation angle 225, k, being 1 may not account for the elemental gain drop.

Accordingly, in some examples, $w_{n,k}$ may be based on azimuth angle 230 (e.g., $w_{n,k}$ may be a function of n). In other words, $w_{n,k}$ may be reduced for azimuth angles 230 beyond the boresight direction based on the elemental gain drop. For example, $w_{n,k}$ for each azimuth angle 230 in the range of azimuth angles 230 may be based on a ratio of an elemental gain associated with an antenna of the network entity 105-$a$ at the respective azimuth angle 230 from the range of azimuth angles 230 to a maximum elemental gain associated with the antenna over the range of azimuth angles 230. An example of the ratio may be illustrated in the following Equation 3:

$$w_{n,k} = \frac{\text{Elemental gain}(\varphi_n)}{\max_\varphi \text{Elemental gain}(\varphi)} \quad (3)$$

which reduces $w_{n,k}$ as indicated by an elemental gain pattern. In such cases, beamforming vectors associated with the average EIRP mask may steer energy towards specific directions, as indicated by $\theta_{TL,k}$ and $\varphi_{SC,k}$ in Equation 1. However, $w_{n,k}$ may be 1 for all beamforming vectors.

Additionally, or alternatively, $w_{n,k}$ may be based on elevation angle 225 (e.g., $w_{n,k}$ may be a function of k). In other words, $w_{n,k}$ associated with different beamforming vectors, denoted as $w_k$, may be proportional to a signal strength observed (e.g., measured) at the UE 115-$a$ (e.g., victim node, intended UE 115-$a$), as a transmission power associated with different beamforming vectors may be different. For example, $w_{n,k}$ for each beamforming vector (e.g., based on the elevation angle 225) may be based on a ratio of an RSRP associated with steering the transmit beam 220 towards a first elevation angle 225 from a range of elevation angles 225 to a maximum RSRP associated with steering the transmit beam 220 over the range of elevation angles 225. An example of the ratio may be illustrated in the following Equation 4:

$$w_{n,k} = \frac{RSRP(w_k)}{\max_k RSRP(w_k)} \quad (4)$$

which reduces $w_{n,k}$ based on the beamforming vectors steering directions. In such cases, the network entity 105-$a$ may refrain from using directional beams for transmission. That is, adaptive (e.g., dynamic) weights, as described herein, may support (e.g., create) a multi-beam over many different directions to co-phase energy across distinct clusters in a channel to an intended receiver, such as the UE 115-$a$ (e.g., single-user MIMO) or to multiple receivers (e.g., multi-user MIMO) at the same time. As such, the average EIRP may be defined for multi beams (e.g., rather than directional beams). That is, RSRP observed by the UE 115-$a$ may be reduced for multi-beams.

Additionally, or alternatively, $w_{n,k}$ may be based on a first differential between a baseline (e.g., default) elevation angle 225 and a given elevation angle 225, a baseline azimuth angle 230 and a given azimuth angle 230, or both. For example, a baseline $w_{n,k}$ may be defined for the baseline elevation angle 225, the baseline azimuth angle 230, or both, such that $w_{n,k}$ for the given elevation angle 225, the given azimuth angle 230, or both, may be based on the first differential. Further, a second differential between the baseline $w_{n,k}$ and the $w_{n,k}$ for the given elevation angle 225, the given azimuth angle 230, or both, may be based on the first differential.

Additionally, or alternatively, the average EIRP mask may be based on different multi-beams, $w_k$, such that $w_{n,k}$ may be proportional to the received signal strengths. For example, $w_{n,k}$ for each multi-beam may be based on a ratio of an RSRP associated with steering multiple transmit beams 220 generated with an antenna array towards a first elevation angle 225 from the range of elevation angles 225 to a maximum RSRP associated with steering the multiple transmit beams 220 over the range of elevation angles 225.

In some examples, the values of $w_{n,k}$ may be averaged over a duration based on a configuration of the network entity 105-$a$ (e.g., $w_{n,k}$ may be time-averaged). That is, the network entity 105-$a$ may calculate the set of weights, $w_{n,k}$, at different instances within the duration and average the values of each weight of the set of weights at the different instances to determine a time-averaged set of weights.

Similarly, to meet the average EIRP mask for a transmission, the network entity 105-$a$ may time average values of EIRP associated with each elevation angle 225 of the range of elevation angles 225, each azimuth angle 230 of the range of azimuth angles 230, or both. That is, the network entity 105-$a$ may transmit one or more signals based on the values of $w_{n,k}$ over each elevation angle 225 of the range of elevation angles 225, each azimuth angle 230 of the range of azimuth angles 230, or both, over a time duration. As such, each transmission may be associated with an EIRP value (e.g., further associated with a respective elevation angle 225, a respective azimuth angle 230, or both). Additionally, the network entity 105-$a$ may average the EIRP values (e.g., a set of EIRP values) associated with transmission of the one or more signals over each elevation angle 225 of the range of elevation angles 225, each azimuth angle 230 of the range of azimuth angles 230, or both, over the time duration. As such, meeting an average EIRP conformance requirement may be based on the time-averaged EIRP values being less than those indicated by the average EIRP mask. In such cases, the time duration may be based on a configuration of the network entity 105-$a$ (e.g., pre-configured, indicated by an additional wireless device, or could be provided by a regulatory entity in a conformance requirement specifications).

In some examples, the range of elevation angles 225, the range of azimuth angles 230, or both, used to calculate the average EIRP mask may be reduced locally over a region (e.g., over a range of elevation angles 225, a range of azimuth angles 230, or both). That is, instead of generating the average EIRP mask over -180 degrees to 180 degrees azimuth, the average EIRP mask may be generated over a reduced range (e.g., which may be defined for any frequency). For example, the range of elevation angles 225, the range of azimuth angles 230, or both, may be fixed for any elevation angle, for any azimuth angle 230, or both (e.g., -60 degrees to 60 degrees azimuth for any elevation angle 225). In another example, the range of elevation angles 225, the range of azimuth angles 230, or both, may be based on a given elevation angle 225, a given azimuth angle 230, or both. For example, around the equator (e.g., 90 degrees elevation), the average EIRP mask may be generated according to a smaller range of elevation angles 225 (e.g., due to a $\sin(\theta)$ weighting or to reduce the impact of the equivalent effect as Mercator projection on a global map) as compared to a range of elevation angles 225 associated with a differential elevation angle 225 away from the equator (e.g., $\theta$ away from 90 degrees elevation). In another example, the range of azimuth angles 230 may increase as a given azimuth angle 230 moves away from 90 degrees elevation.

In some examples, the average EIRP mask may be associated with multiple frequencies simultaneously. That is, the techniques described herein may be frequency agnostic, such that the average EIRP mask may be generated according to any of the techniques described herein for different frequency bands, different frequencies within a same frequency band, or both.

Though described in the context of a network entity 105-*a*, this is not to be regarded as a limitation of the present disclosure. In this regard, any wireless device may generate an average EIRP mask in accordance with the techniques described herein. Further, Equation 3 and Equation 4, for generating the weights $w_{n,k}$, are example illustrations and the corresponding average EIRP mask weighting factors may be determined as a function of the elemental gain or the RSRP in a functional sense without recourse to Equation 3 or Equation 4.

FIG. 3 shows an example of a process flow 300 that supports techniques for generating an EIRP mask to enable interference mitigation in accordance with one or more aspects of the present disclosure. In some cases, the process flow 300 may implement or be implemented by aspects of the wireless communication system 100, the wireless communications system 200, or both. For example, the process flow 300 may include one or more UEs 115 (e.g., a UE 115-*b*) and one or more network entities 105 (e.g., a network entity 105-*b* and a network entity 105-*c*), which may be examples of the corresponding devices as described with reference to FIG. 1.

In some examples, at 305, the network entity 105-*b* may transmit (e.g., to the network entity 105-*c*, another wireless device, a compliance monitoring entity such as a regulatory body, etc.) an indication of a capability of the network entity 105-*b* to generate a set of weighted values for an average EIRP mask based on one or more directional parameters associated with a beamforming direction of a transmit beam (e.g., an indication of compliance).

In some examples, at 310, the network entity 105-*b* may receive an indication of a duration associated with generating the set of weighted values for the average EIRP mask, such that the network entity 105-*b* may, at 315, initiate a timer associated with the duration based on receiving the indication.

At 320, the network entity 105-*b* may obtain one or more information bits for transmission by the network entity 105-*b* via the transmit beam of multiple transmit beams of the network entity 105-*b*.

At 325, the network entity 105-*b* may generate, based on one or more directional parameters associated with the beamforming direction of the transmit beam, the set of weighted values for the transmission (e.g., a beamformed transmission) of the one or more information bits to satisfy the average EIRP. The one or more direction parameters may include an azimuth angle, an elevation angle, or both.

For example, the one or more directional parameters may include the azimuth angle. As such, the network entity 105-*b* may generate a first weighted value (e.g., $w_{n,k}$) of the set of weighted values based on a ratio of an elemental gain associated with an antenna at a first azimuth angle (e.g., On) from a range of azimuth angles to a maximum elemental gain associated with the antenna over the range of azimuth angles. In such cases, the ratio may be averaged over a time duration, where the duration is based on a configuration of the network entity 105-*b* (e.g., signaled to the network entity 105-*b* or pre-configured).

Additionally, or alternatively, the one or more directional parameters may include the elevation angle. As such, the network entity 105-*b* may generate the first weighted value (e.g., $w_{n,k}$) of the set of weighted values based on a ratio of an RSRP associated with steering the transmit beam towards a first elevation angle (e.g., $\theta$) from a range of elevation angles to a maximum RSRP associated with steering the transmit beam over the range of elevation angles. In such cases, the ratio may be averaged over a time duration, where the duration is based on the configuration of the network entity 105-*b*.

Additionally, or alternatively, the network entity 105-*b* may generate the first weighted value of the set of weighted values based on a ratio of an RSRP associated with steering the multiple transmit beams generated with an antenna array towards the first elevation angle from the range of elevation angles to a maximum RSRP associated with steering the plurality of transmit beams over the range of elevation angles. In such cases, the ratio may be averaged over a time duration, where the duration is based on the configuration of the network entity 105-*b*.

Additionally, or alternatively, the one or more directional parameters may include the elevation angle and the azimuth angle. As such, the network entity 105-*b* may generate the first weighted value (e.g., default weighted value) of the set of weighted values associated with the first azimuth angle (e.g., default azimuth angle) and the first elevation angle (e.g., default elevation angle). Additionally, the network entity 105-*b* may generate a second weighted value of the set of weighted values associated with a second azimuth angle and a second elevation angle based on a first difference between the first azimuth angle and the second azimuth angle, between the first elevation angle and the second elevation angle, or both. In such cases, a second difference between the first weighted value and the second weighted value may be based on the first difference. In such cases, the second difference may be averaged over a time duration, where the duration is based on the configuration of the network entity 105-*b*.

In some cases, at 330, the network entity 105-*b* may generate (e.g., calculate, measure) the average EIRP mask based on averaging a transmitted power over a range of values of the one or more directional parameters using the set of weighted values. In such cases, the range of values may be based on frequency of the transmission and may include a range of azimuth angles, a range of elevation angles, or both. In some examples, the range of values of the one or more directional parameters may be a fixed range independent of the beamforming direction of the transmit beam. In some other examples, the range of values of the one or more directional parameters may be based on the beamforming direction of the transmit beam.

At 335, the network entity 105-*b* may transmit (e.g., to the UE 115-*b* prior to expiration of the timer), via the transmit beam in the beamforming direction based on the one or more directional parameters and the set of weighted values, a signal including the one or more information bits to meet the average EIRP mask. The average EIRP mask may be associated with multiple frequency ranges (e.g., bands), multiple frequencies within a frequency range, or both.

FIG. 4 shows a block diagram 400 of a device 405 that supports techniques for meeting an EIRP mask to support interference mitigation in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to support the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for meeting an EIRP mask to support interference mitigation). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for generating an EIRP mask to support interference mitigation). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for meeting an EIRP mask to support interference mitigation as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a wireless device in accordance with examples as disclosed herein. For example, the communications manager 420 is capable of, configured to, or operable to support a means for obtaining one or more information bits for transmission by the wireless device via a transmit beam of a set of multiple transmit beams of the wireless device. The communications manager 420 is capable of, configured to, or operable to support a means for generating, based on one or more directional parameters associated with a beamforming direction of the transmit beam, a set of weighted values for the transmission of the one or more information bits to satisfy an EIRP mask. The communications manager 420 is capable of, configured to, or operable to support a means for transmitting, via the transmit beam in the beamforming direction based on the one or more directional parameters and the set of weighted values, a beamformed signal including the one or more information bits to meet the average EIRP mask.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for meeting an average EIRP mask in accordance with a set of weighted values which may result in reduced processing, reduced power consumption, and more efficient utilization of communication resources, among other advantages.

FIG. 5 shows a block diagram 500 of a device 505 that supports techniques for meeting an EIRP mask to enable interference mitigation in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, and the communications manager 520), may also include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for generating an EIRP mask to support interference mitigation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for generating an EIRP mask to support interference mitigation). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for generating an EIRP mask to support interference mitigation as described herein. For example, the communications manager 520 may include an information bit component 525, a power mask component 530, a beamforming component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a wireless device in accordance with examples as disclosed herein. The information bit component 525 is capable of, configured to, or operable to support a means for obtaining one or more information bits for transmission by the wireless device via a transmit beam of a set of multiple transmit beams of the wireless device. The power mask component 530 is capable of, configured to, or operable to support a means for generating, based on one or more directional parameters associated with a beamforming direction of the transmit beam, a set of weighted values for the transmission of the one or more information bits to satisfy an EIRP mask. The beamforming component 535 is capable of, configured to, or operable to support a means for transmitting, via the transmit beam in the beamforming direction based on the one or more directional parameters and the set of weighted values, a beamformed signal including the one or more information bits to meet the average EIRP mask.

FIG. 6 shows a block diagram 600 of a communications manager 620 that supports techniques for generating an EIRP mask to support interference mitigation in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for generating an EIRP mask to support interference mitigation as described herein. For example, the communications manager 620 may include an information bit component 625, a power mask component 630, a beamforming component 635, a capability component 640, a timing component 645, or any combination thereof. Each of these components, or components of subcomponents thereof (e.g., one or more processors, one or more memories), may communicate, directly or indirectly, with one another (e.g., via one or more buses).

The communications manager 620 may support wireless communications at a wireless device in accordance with examples as disclosed herein. The information bit component 625 is capable of, configured to, or operable to support a means for obtaining one or more information bits for transmission by the wireless device via a transmit beam of a set of multiple transmit beams of the wireless device. The power mask component 630 is capable of, configured to, or operable to support a means for generating, based on one or more directional parameters associated with a beamforming direction of the transmit beam, a set of weighted values for the transmission of the one or more information bits to satisfy an EIRP mask. The beamforming component 635 is capable of, configured to, or operable to support a means for transmitting, via the transmit beam in the beamforming direction based on the one or more directional parameters and the set of weighted values, a beamformed signal including the one or more information bits to meet the average EIRP mask.

In some examples, to support meeting the average EIRP mask, the power mask component 630 is capable of, configured to, or operable to support a means for transmitting, based on the set of weighted values, one or more additional signals over a range of azimuth angles, a range of elevation angles or both. In some examples, to support meeting the average EIRP mask, the power mask component 630 is capable of, configured to, or operable to support a means for averaging a set of EIRP values associated with each azimuth angle of the range of azimuth angles, each elevation angle of the range of elevation angles, or both, over a time duration, where meeting the average EIRP mask is based on the averaged set of EIRP values being less than the average EIRP mask.

In some examples, the time duration over which the set of EIRP values is averaged is based on a configuration of the wireless device or based on a regulatory requirement.

In some examples, to support generating the set of weighted values, the power mask component 630 is capable of, configured to, or operable to support a means for generating a first weighted value of the set of weighted values based on a ratio of an elemental gain associated with an antenna at a first azimuth angle from a range of azimuth angles to a maximum elemental gain associated with the antenna over the range of azimuth angles.

In some examples, the ratio is averaged over a time duration. In some examples, the time duration is based on a configuration of the wireless device.

In some examples, to support generating the set of weighted values, the power mask component 630 is capable of, configured to, or operable to support a means for generating a first weighted value of the set of weighted values based on a ratio of an RSRP associated with steering the transmit beam towards a first elevation angle from a range of elevation angles to a maximum RSRP associated with steering the transmit beam over the range of elevation angles.

In some examples, the ratio is averaged over a time duration. In some examples, the time duration is based on a configuration of the wireless device.

In some examples, to support generating the set of weighted values, the power mask component 630 is capable of, configured to, or operable to support a means for generating a first weighted value of the set of weighted values associated with a first azimuth angle and a first elevation angle. In some examples, to support generating the set of weighted values, the power mask component 630 is capable of, configured to, or operable to support a means for generating a second weighted value of the set of weighted values associated with a second azimuth angle and a second elevation angle based on a first difference between the first azimuth angle and the second azimuth angle, between the first elevation angle and the second elevation angle, or both, where a second difference between the first weighted value and the second weighted value is based on the first difference.

In some examples, the second difference is averaged over a time duration. In some examples, the time duration is based on a configuration of the wireless device.

In some examples, the power mask component 630 is capable of, configured to, or operable to support a means for generating the average EIRP mask based on averaging a transmitted power over a range of values of the one or more directional parameters using the set of weighted values, where the range of values is based on a frequency associated with transmission of the signal.

In some examples, the range of values of the one or more directional parameters includes a range of azimuth angles, a range of elevation angles, or both.

In some examples, the range of values of the one or more directional parameters is a fixed range independent of the beamforming direction of the transmit beam.

In some examples, the range of values of the one or more directional parameters is based on the beamforming direction of the transmit beam.

In some examples, to support generating the set of weighted values, the power mask component 630 is capable of, configured to, or operable to support a means for generating a first weighted value of the set of weighted values based on a ratio of an RSRP associated with steering the set of multiple transmit beams generated with an antenna array towards a first elevation angle from a range of elevation angles to a maximum RSRP associated with steering the set of multiple transmit beams over the range of elevation angles.

In some examples, the ratio is averaged over a time duration. In some examples, the time duration is based on a configuration of the wireless device.

In some examples, the capability component 640 is capable of, configured to, or operable to support a means for transmitting an indication of a capability of the wireless device to generate the set of weighted values for the average EIRP mask based on the one or more directional parameters associated with the beamforming direction of the transmit beam.

In some examples, the timing component 645 is capable of, configured to, or operable to support a means for receiving an indication of a time duration associated with generating the set of weighted values for the average EIRP mask. In some examples, the timing component 645 is capable of, configured to, or operable to support a means for initiating a timer associated with the time duration based on receiving the indication, where the one or more information bits are transmitted prior to expiration of the timer.

In some examples, the average EIRP mask is associated with a set of multiple frequency ranges, a set of multiple frequencies within a frequency range, or both.

In some examples, the one or more directional parameters includes an azimuth angle, an elevation angle, or both.

FIG. 7 shows a diagram of a system 700 including a device 705 that supports techniques for generating an EIRP mask to support interference mitigation in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting techniques for generating an EIRP mask to support interference mitigation). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein.

The communications manager 720 may support wireless communications at a wireless device in accordance with examples as disclosed herein. For example, the communications manager 720 is capable of, configured to, or operable to support a means for obtaining one or more information bits for transmission by the wireless device via a transmit beam of a set of multiple transmit beams of the wireless device. The communications manager 720 is capable of, configured to, or operable to support a means for generating, based on one or more directional parameters associated with a beamforming direction of the transmit beam, a set of weighted values for the transmission of the one or more information bits to satisfy an EIRP mask. The communications manager 720 is capable of, configured to, or operable to support a means for transmitting, via the transmit beam in the beamforming direction based on the one or more directional parameters and the set of weighted values, a beamformed signal including the one or more information bits to meet the average EIRP mask.

By including or configuring the communications manager 720 in accordance with examples as described herein, the device 705 may support techniques for generating an average EIRP mask in accordance with a set of weighted values which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of techniques for generating an EIRP mask to support interference mitigation as described herein, or the at least one processor 740 and the at least one memory 730 may be otherwise configured to, individually or collectively, perform or support such operations.

FIG. 8 shows a flowchart illustrating a method 800 that supports techniques for generating an EIRP mask to support interference mitigation in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include obtaining one or more information bits for transmission by the wireless device via a transmit beam of a set of multiple transmit beams of the wireless device. The operations of block 805 may be performed in accordance with examples as disclosed herein. In some examples, aspects of the operations of 805 may be performed by an information bit component 625 as described with reference to FIG. 6.

At 810, the method may include generating, based on one or more directional parameters associated with a beamforming direction of the transmit beam, a set of weighted values for the transmission of the one or more information bits to satisfy an EIRP mask. The operations of block 810 may be performed in accordance with examples as disclosed herein. In some examples, aspects of the operations of 810 may be performed by a power mask component 630 as described with reference to FIG. 6.

At 815, the method may include transmitting, via the transmit beam in the beamforming direction based on the one or more directional parameters and the set of weighted values, a beamformed signal including the one or more information bits to meet the average EIRP mask. The operations of block 815 may be performed in accordance with examples as disclosed herein. In some examples, aspects of the operations of 815 may be performed by a beamforming component 635 as described with reference to FIG. 6.

FIG. 9 shows a flowchart illustrating a method 900 that supports techniques for generating an EIRP mask to support interference mitigation in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include obtaining one or more information bits for transmission by the wireless device via a transmit beam of a set of multiple transmit beams of the wireless device. The operations of block 905 may be performed in accordance with examples as disclosed herein. In some examples, aspects of the operations of 905 may be performed by an information bit component 625 as described with reference to FIG. 6.

At 910, the method may include generating, based on one or more directional parameters associated with a beamforming direction of the transmit beam, a set of weighted values for the transmission of the one or more information bits to satisfy an EIRP mask. The operations of block 910 may be performed in accordance with examples as disclosed herein. In some examples, aspects of the operations of 910 may be performed by a power mask component 630 as described with reference to FIG. 6.

At 915, the method may include transmitting, via the transmit beam in the beamforming direction based on the one or more directional parameters and the set of weighted values, a beamformed signal including the one or more information bits to meet the average EIRP mask. The operations of block 915 may be performed in accordance with examples as disclosed herein. In some examples, aspects of the operations of 915 may be performed by a beamforming component 635 as described with reference to FIG. 6.

The following provides an overview of aspects of the present disclosure:

Aspect 1: A method for wireless communications at a wireless device, comprising: obtaining one or more information bits for transmission by the wireless device via a transmit beam of a plurality of transmit beams of the wireless device; generating, based at least in part on one or more directional parameters associated with a beamforming direction of the transmit beam, a set of weighted values for the transmission of the one or more information bits to satisfy an average EIRP mask; and transmitting, via the transmit beam in the beamforming direction based at least in part on the one or more directional parameters and the set of weighted values, a beamformed signal comprising the one or more information bits to meet the average EIRP mask.

Aspect 2: The method of aspect 1, wherein the one or more directional parameters comprises an azimuth angle, an elevation angle, or both, and wherein meeting the average EIRP mask comprises: transmitting, based at least in part on the set of weighted values, one or more additional signals over a range of azimuth angles, a range of elevation angles or both; and averaging a set of EIRP values associated with each azimuth angle of the range of azimuth angles, each elevation angle of the range of elevation angles, or both, over a time duration, wherein meeting the average EIRP mask is based at least in part on the averaged set of EIRP values being less than the average EIRP mask.

Aspect 3: The method of aspect 2, wherein the time duration over which the set of EIRP values is averaged is based at least in part on a configuration of the wireless device or based at least in part on a regulatory requirement.

Aspect 4: The method of any of aspects 1 through 3, wherein the one or more directional parameters comprises an azimuth angle, and wherein generating the set of weighted values comprises: generating a first weighted value of the set of weighted values based at least in part on a ratio of an elemental gain associated with an antenna at a first azimuth angle from a range of azimuth angles to a maximum elemental gain associated with the antenna over the range of azimuth angles.

Aspect 5: The method of aspect 4, wherein the ratio is averaged over a time duration, and the time duration is based at least in part on a configuration of the wireless device.

Aspect 6: The method of any of aspects 1 through 5, wherein the one or more directional parameters comprises an elevation angle, and wherein generating the set of weighted values comprises: generating a first weighted value of the set of weighted values based at least in part on a ratio of a RSRP associated with steering the transmit beam towards a first elevation angle from a range of elevation angles to a maximum RSRP associated with steering the transmit beam over the range of elevation angles.

Aspect 7: The method of aspect 6, wherein the ratio is averaged over a time duration, and the time duration is based at least in part on a configuration of the wireless device.

Aspect 8: The method of any of aspects 1 through 7, wherein the one or more directional parameters comprises an azimuth angle and an elevation angle, and wherein generating the set of weighted values comprises: generating a first weighted value of the set of weighted values associ-
ated with a first azimuth angle and a first elevation angle; and generating a second weighted value of the set of weighted values associated with a second azimuth angle and a second elevation angle based at least in part on a first difference between the first azimuth angle and the second azimuth angle, between the first elevation angle and the second elevation angle, or both, wherein a second difference between the first weighted value and the second weighted value is based at least in part on the first difference.

Aspect 9: The method of aspect 8, wherein the second difference is averaged over a time duration, and the time duration is based at least in part on a configuration of the wireless device.

Aspect 10: The method of any of aspects 1 through 9, further comprising: generating the average EIRP mask based at least in part on averaging a transmitted power over a range of values of the one or more directional parameters using the set of weighted values, wherein the range of values is based at least in part on a frequency associated with transmission of the signal.

Aspect 11: The method of aspect 10, wherein the range of values of the one or more directional parameters comprises a range of azimuth angles, a range of elevation angles, or both.

Aspect 12: The method of any of aspects 10 through 11, wherein the range of values of the one or more directional parameters is a fixed range independent of the beamforming direction of the transmit beam.

Aspect 13: The method of any of aspects 10 through 12, wherein the range of values of the one or more directional parameters is based at least in part on the beamforming direction of the transmit beam.

Aspect 14: The method of any of aspects 1 through 13, wherein the one or more directional parameters comprises an elevation angle, and wherein generating the set of weighted values comprises: generating a first weighted value of the set of weighted values based at least in part on a ratio of a RSRP associated with steering the plurality of transmit beams generated with an antenna array towards a first elevation angle from a range of elevation angles to a maximum RSRP associated with steering the plurality of transmit beams over the range of elevation angles.

Aspect 15: The method of aspect 14, wherein the ratio is averaged over a time duration, and the time duration is based at least in part on a configuration of the wireless device.

Aspect 16: The method of any of aspects 1 through 15, further comprising: transmitting an indication of a capability of the wireless device to generate the set of weighted values for the average EIRP mask based at least in part on the one or more directional parameters associated with the beamforming direction of the transmit beam.

Aspect 17: The method of any of aspects 1 through 16, further comprising: receiving an indication of a time duration associated with generating the set of weighted values for the average EIRP mask; and initiating a timer associated with the time duration based at least in part on receiving the indication, wherein the one or more information bits are transmitted prior to expiration of the timer.

Aspect 18: The method of any of aspects 1 through 17, wherein the average EIRP mask is associated with a plurality of frequency ranges, a plurality of frequencies within a frequency range, or both.

Aspect 19: The method of any of aspects 1 through 18, wherein the one or more directional parameters comprises an azimuth angle, an elevation angle, or both.

Aspect 20: An apparatus for wireless communications at a wireless device, comprising at least one processor; at least one memory coupled with the at least one processor; and instructions stored in the at least one memory and executable by the at least one processor to cause the apparatus to perform a method of any of aspects 1 through 19.

Aspect 21: An apparatus for wireless communications at a wireless device, comprising at least one means for performing a method of any of aspects 1 through 19.

Aspect 22: A non-transitory computer-readable medium storing code for wireless communications at a wireless device, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component"

subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a wireless device, comprising:
at least one processor;
at least one memory coupled with the at least one processor; and
instructions stored in the at least one memory and executable by the at least one processor to cause the apparatus to:
obtain one or more information bits for transmission by the wireless device via a transmit beam of a plurality of transmit beams of the wireless device;
generate, based at least in part on one or more directional parameters associated with a beamforming direction of the transmit beam, a set of weighted values for the transmission of the one or more information bits to satisfy an average effective isotropic radiated power (EIRP) mask, the average EIRP mask generated by averaging a set of EIRP values corresponding to a plurality of directions over a time duration, the plurality of directions in accordance with the one or more directional parameters; and
transmit, via the transmit beam in the beamforming direction based at least in part on the one or more directional parameters and the set of weighted values, a signal comprising the one or more information bits to meet the average EIRP mask.

2. The apparatus of claim 1, wherein the one or more directional parameters comprises an azimuth angle, an elevation angle, or both, and wherein, to meet the average EIRP mask, the instructions are further executable by the at least one processor to cause the apparatus to:
transmit, based at least in part on the set of weighted values, one or more additional signals over a range of azimuth angles, a range of elevation angles or both, wherein the plurality of directions comprise the range of azimuth angles, the range of elevation angles, or both; and
average the set of EIRP values associated with each azimuth angle of the range of azimuth angles, each elevation angle of the range of elevation angles, or both, over the time duration, wherein meeting the average EIRP mask is based at least in part on the averaged set of EIRP values being less than the average EIRP mask.

3. The apparatus of claim 2, wherein the time duration over which the set of EIRP values is averaged is based at least in part on a configuration of the wireless device or based at least in part on a regulatory requirement.

4. The apparatus of claim 1, wherein the one or more directional parameters comprises an azimuth angle, and wherein the instructions to generate the set of weighted values are executable by the at least one processor to cause the apparatus to:
generate a first weighted value of the set of weighted values based at least in part on a ratio of an elemental gain associated with an antenna at a first azimuth angle from a range of azimuth angles to a maximum elemental gain associated with the antenna over the range of azimuth angles, wherein the plurality of directions comprise the range of azimuth angles.

5. The apparatus of claim 4, wherein the ratio is averaged over the time duration, and wherein the time duration is based at least in part on a configuration of the wireless device.

6. The apparatus of claim 1, wherein the one or more directional parameters comprises an elevation angle, and wherein the instructions to generate the set of weighted values are executable by the at least one processor to cause the apparatus to:
generate a first weighted value of the set of weighted values based at least in part on a ratio of a reference signal received power (RSRP) associated with steering the transmit beam towards a first elevation angle from a range of elevation angles to a maximum RSRP associated with steering the transmit beam over the range of elevation angles, wherein the plurality of directions comprise the range of elevation angles.

7. The apparatus of claim 6, wherein the ratio is averaged over the time duration, and wherein the time duration is based at least in part on a configuration of the wireless device.

8. The apparatus of claim 1, wherein the one or more directional parameters comprises an azimuth angle and an elevation angle, and wherein the instructions to generate the set of weighted values are executable by the at least one processor to cause the apparatus to:

generate a first weighted value of the set of weighted values associated with a first azimuth angle and a first elevation angle; and generate a second weighted value of the set of weighted values associated with a second azimuth angle and a second elevation angle based at least in part on a first difference between the first azimuth angle and the second azimuth angle, between the first elevation angle and the second elevation angle, or both, wherein a second difference between the first weighted value and the second weighted value is based at least in part on the first difference, wherein the plurality of directions comprise first azimuth angle, the second azimuth angle, the first elevation angle, and the second elevation angle.

9. The apparatus of claim 8, wherein the first difference is averaged over the time duration, and wherein the time duration is based at least in part on a configuration of the wireless device.

10. The apparatus of claim 1, wherein the instructions are further executable by the at least one processor to cause the apparatus to:

generate the average EIRP mask based at least in part on averaging a transmitted power over a range of values of the one or more directional parameters using the set of weighted values, wherein the range of values is based at least in part on a frequency associated with transmission of the signal, and wherein the plurality of directions comprise the range of values.

11. The apparatus of claim 10, wherein the range of values of the one or more directional parameters comprises a range of azimuth angles, a range of elevation angles, or both.

12. The apparatus of claim 10, wherein the range of values of the one or more directional parameters is a fixed range independent of the beamforming direction of the transmit beam.

13. The apparatus of claim 10, wherein the range of values of the one or more directional parameters is based at least in part on the beamforming direction of the transmit beam.

14. The apparatus of claim 1, wherein the one or more directional parameters comprises an elevation angle, and wherein the instructions to generate the set of weighted values are executable by the at least one processor to cause the apparatus to:

generate a first weighted value of the set of weighted values based at least in part on a ratio of a reference signal received power (RSRP) associated with steering the plurality of transmit beams generated with an antenna array towards a first elevation angle from a range of elevation angles to a maximum RSRP associated with steering the plurality of transmit beams over the range of elevation angles, wherein the plurality of directions comprise the range of elevation angles.

15. The apparatus of claim 14, wherein the ratio is averaged over the time duration, and wherein the time duration is based at least in part on a configuration of the wireless device.

16. The apparatus of claim 1, wherein the instructions are further executable by the at least one processor to cause the apparatus to:

transmit an indication of a capability of the wireless device to generate the set of weighted values for the average EIRP mask based at least in part on the one or more directional parameters associated with the beamforming direction of the transmit beam.

17. The apparatus of claim 1, wherein the instructions are further executable by the at least one processor to cause the apparatus to:

receive an indication of the time duration associated with generating the set of weighted values for the average EIRP mask; and initiate a timer associated with the time duration based at least in part on receiving the indication, wherein the one or more information bits are transmitted prior to expiration of the timer.

18. The apparatus of claim 1, wherein the average EIRP mask is associated with a plurality of frequency ranges, a plurality of frequencies within a frequency range, or both.

19. The apparatus of claim 1, wherein the one or more directional parameters comprises an azimuth angle, an elevation angle, or both.

20. A method for wireless communications at a wireless device, comprising:

obtaining one or more information bits for transmission by the wireless device via a transmit beam of a plurality of transmit beams of the wireless device;

generating, based at least in part on one or more directional parameters associated with a beamforming direction of the transmit beam, a set of weighted values for the transmission of the one or more information bits to satisfy an average effective isotropic radiated power (EIRP) mask, the average EIRP mask generated by averaging a set of EIRP values corresponding to a plurality of directions over a time duration, the plurality of directions in accordance with the one or more directional parameters; and transmitting, via the transmit beam in the beamforming direction based at least in part on the one or more directional parameters and the set of weighted values, a beamformed signal comprising the one or more information bits to meet the average EIRP mask.

21. The method of claim 20, wherein the one or more directional parameters comprises an azimuth angle, an elevation angle, or both, and wherein meeting the average EIRP mask comprises:

transmitting, based at least in part on the set of weighted values, one or more additional signals over a range of azimuth angles, a range of elevation angles or both; and averaging the set of EIRP values associated with each azimuth angle of the range of azimuth angles, each elevation angle of the range of elevation angles, or both, over the time duration, wherein meeting the average EIRP mask is based at least in part on the averaged set of EIRP values being less than the average EIRP mask, wherein the plurality of directions comprise the range of azimuth angles, the range of elevation angles, or both.

22. The method of claim 20, wherein the one or more directional parameters comprises an azimuth angle, and wherein generating the set of weighted values comprises:

generate a first weighted value of the set of weighted values based at least in part on a ratio of an elemental gain associated with an antenna at a first azimuth angle from a range of azimuth angles to a maximum elemental gain associated with the antenna over the range of azimuth angles, wherein the plurality of directions comprise the range of azimuth angles.

23. The method of claim 20, wherein the one or more directional parameters comprises an elevation angle, and wherein generating the set of weighted values comprises:

generate a first weighted value of the set of weighted values based at least in part on a ratio of a reference signal received power (RSRP) associated with steering the transmit beam towards a first elevation angle from a range of elevation angles to a maximum RSRP associated with steering the transmit beam over the range of elevation angles, wherein the plurality of directions comprise the range of elevation angles.

24. The method of claim 20, wherein the one or more directional parameters comprises an azimuth angle and an elevation angle, and wherein generating the set of weighted values comprises:

generating a first weighted value of the set of weighted values associated with a first azimuth angle and a first elevation angle; and generating a second weighted value of the set of weighted values associated with a second azimuth angle and a second elevation angle based at least in part on a first difference between the first azimuth angle and the second azimuth angle, between the first elevation angle and the second elevation angle, or both, wherein a second difference between the first weighted value and the second weighted value is based at least in part on the first difference, wherein the plurality of directions comprise first azimuth angle, the second azimuth angle, the first elevation angle, and the second elevation angle.

25. The method of claim 20, further comprising:

generating the average EIRP mask based at least in part on averaging a transmitted power over a range of values of the one or more directional parameters using the set of weighted values, wherein the range of values is based at least in part on a frequency associated with transmission of the beamformed signal, and wherein the plurality of directions comprise the range of values.

26. The method of claim 20, wherein the one or more directional parameters comprises an elevation angle, and wherein generating the set of weighted values comprises:

generating a first weighted value of the set of weighted values based at least in part on a ratio of a reference signal received power (RSRP) associated with steering the plurality of transmit beams generated with an antenna array towards a first elevation angle from a range of elevation angles to a maximum RSRP associated with steering the plurality of transmit beams over the range of elevation angles, wherein the plurality of directions comprise the range of elevation angles.

27. The method of claim 20, further comprising:

transmitting an indication of a capability of the wireless device to generate the set of weighted values for the average EIRP mask based at least in part on the one or more directional parameters associated with the beamforming direction of the transmit beam.

28. The method of claim 20, further comprising:

receiving an indication of the time duration associated with generating the set of weighted values for the average EIRP mask; and initiating a timer associated with the time duration based at least in part on receiving the indication, wherein the one or more information bits are transmitted prior to expiration of the timer.

29. An apparatus for wireless communications at a wireless device, comprising:

means for obtaining one or more information bits for transmission by the wireless device via a transmit beam of a plurality of transmit beams of the wireless device;

means for generating, based at least in part on one or more directional parameters associated with a beamforming direction of the transmit beam, a set of weighted values for the transmission of the one or more information bits to satisfy an average effective isotropic radiated power (EIRP) mask, the average EIRP mask generated by averaging a set of EIRP values corresponding to a plurality of directions over a time duration, the plurality of directions in accordance with the one or more directional parameters; and means for transmitting, via the transmit beam in the beamforming direction based at least in part on the one or more directional parameters and the set of weighted values, a signal comprising the one or more information bits to meet the average EIRP mask.

30. A non-transitory computer-readable medium storing code for wireless communications at a wireless device, the code comprising instructions executable by a processor to:

obtain one or more information bits for transmission by the wireless device via a transmit beam of a plurality of transmit beams of the wireless device;

generate, based at least in part on one or more directional parameters associated with a beamforming direction of the transmit beam, a set of weighted values for the transmission of the one or more information bits to satisfy an average effective isotropic radiated power EIRP) mask, the average EIRP mask generated by averaging a set of EIRP values corresponding to a plurality of directions over a time duration, the plurality of directions in accordance with the one or more directional parameters; and transmit, via the transmit beam in the beamforming direction based at least in part on the one or more directional parameters and the set of weighted values, a signal comprising the one or more information bits to meet the average EIRP mask.

* * * * *